US009668587B1

(12) United States Patent
Huang

(10) Patent No.: US 9,668,587 B1
(45) Date of Patent: Jun. 6, 2017

(54) DETACHABLE BED BASE

(71) Applicant: APEX HEALTH CARE MFG. INC., Minxiong Township, Chiayi County (TW)

(72) Inventor: Chi-Chung Huang, Minxiong Township (TW)

(73) Assignee: Apex Health Care Mfg. Inc., Minxiong Township (TW)

( * ) Notice: Subject to any disclaimer, the term of this patent is extended or adjusted under 35 U.S.C. 154(b) by 0 days.

(21) Appl. No.: 15/256,770

(22) Filed: Sep. 6, 2016

(51) Int. Cl.
- *A47C 19/12* (2006.01)
- *A47C 19/02* (2006.01)
- *F16B 12/54* (2006.01)
- *F16B 12/30* (2006.01)

(52) U.S. Cl.
CPC ............ *A47C 19/025* (2013.01); *F16B 12/30* (2013.01); *F16B 12/54* (2013.01)

(58) Field of Classification Search
CPC ... A47C 19/005; A47C 19/021; A47C 19/122; A47C 19/028; A47C 19/12; A47C 19/04; A61G 7/012; A61G 7/00
See application file for complete search history.

(56) References Cited

U.S. PATENT DOCUMENTS

| | | | | |
|---|---|---|---|---|
| 272,077 | A * | 2/1883 | Mueller | A47C 19/04 29/DIG. 102 |
| 605,126 | A * | 6/1898 | Odell | A47C 19/122 5/152 |
| 2,633,578 | A * | 4/1953 | Deves | A61G 7/015 5/611 |
| 2,969,124 | A * | 1/1961 | Nissen | A47C 23/20 482/28 |
| 3,743,351 | A * | 7/1973 | Harris | A47C 17/132 297/107 |
| 4,081,868 | A * | 4/1978 | Hull | A47C 17/02 297/452.56 |
| 4,114,209 | A * | 9/1978 | Sandlin | A61G 7/008 248/370 |
| 4,155,131 | A * | 5/1979 | Harris | A47C 19/005 312/263 |

(Continued)

*Primary Examiner* — David E Sosnowski
*Assistant Examiner* — Ifeolu Adeboyejo
(74) *Attorney, Agent, or Firm* — Alan D. Kamrath; Kamrath IP Lawfirm, P.A.

(57) ABSTRACT

A detachable bed base contains: a first connection assembly, a second connection assembly, multiple support rods, two frames, and multiple screw elements. The first connection assembly includes multiple first hollow tubes, and the second connection assembly includes multiple second hollow tubes. Each of multiple first C-shaped slats has two first through holes for accommodating each of multiple fixing bolts, and each of multiple second C-shaped slats has two second through holes for accommodating said each fixing bolt, wherein said each fixing bolt houses each of multiple pins. Two frames hold the first connection assembly and the second connection assembly, and each frame includes a first extension and two second extensions. The first extension has two hooks, and each of the two second extension has a coupling holder, a fitting trench, and a positioning member. Furthermore, multiple supporters lock the first column, the second column, and the coupling holder together.

2 Claims, 10 Drawing Sheets

(56) References Cited

U.S. PATENT DOCUMENTS

| | | | | |
|---|---|---|---|---|
| 4,202,062 A * | 5/1980 | Marcyan | A61G 7/0533 | 5/285 |
| 4,243,263 A * | 1/1981 | Thiboutot | A47C 4/286 | 297/42 |
| 4,685,160 A * | 8/1987 | Rizzardo | A47C 19/005 | 5/201 |
| 4,901,383 A * | 2/1990 | Yang | A47C 27/085 | 403/205 |
| 4,970,737 A * | 11/1990 | Sagel | A47C 20/08 | 5/201 |
| 5,257,428 A * | 11/1993 | Carroll | A47C 19/122 | 5/201 |
| 5,687,437 A * | 11/1997 | Goldsmith | A47C 19/045 | 5/611 |
| 6,357,065 B1 * | 3/2002 | Adams | A47C 19/04 | 5/611 |
| 6,516,479 B1 * | 2/2003 | Barbour | A47C 19/045 | 5/152 |
| 8,850,638 B1 * | 10/2014 | Suh | A47C 19/12 | 5/176.1 |
| 8,931,123 B1 * | 1/2015 | Oh | A47C 19/005 | 5/132 |
| 9,009,896 B2 * | 4/2015 | Suh | A47C 20/043 | 5/618 |
| 2003/0084509 A1 * | 5/2003 | Harrow | A47C 19/005 | 5/201 |
| 2005/0251917 A1 * | 11/2005 | Wall | A47C 20/041 | 5/618 |
| 2009/0113626 A1 * | 5/2009 | Harrow | A47C 19/005 | 5/132 |
| 2010/0154118 A1 * | 6/2010 | Pearce | A47C 19/021 | 5/201 |
| 2011/0247138 A1 * | 10/2011 | Clenet | A47C 20/04 | 5/613 |
| 2012/0017890 A1 * | 1/2012 | May | A47J 37/0704 | 126/9 R |
| 2012/0168328 A1 * | 7/2012 | Chen | A47C 19/005 | 206/223 |
| 2012/0227180 A1 * | 9/2012 | Chung | A47C 19/005 | 5/400 |
| 2014/0201915 A1 * | 7/2014 | Ermalovich | A47C 20/08 | 5/613 |
| 2014/0259396 A1 * | 9/2014 | McCarty | A47C 19/028 | 5/400 |
| 2014/0366267 A1 * | 12/2014 | Suh | A47C 20/041 | 5/174 |
| 2015/0250323 A1 * | 9/2015 | Goldsmith | A47C 19/045 | 5/11 |
| 2016/0206111 A1 * | 7/2016 | Oh | A47C 19/122 | |

* cited by examiner

DETACHABLE BED BASE

FIELD OF THE INVENTION

The present invention relates to a detachable bed base in which the first connection assembly and the second connection assembly are supported and reinforced stably.

BACKGROUND OF THE INVENTION

A conventional detachable bed base contains a first connection assembly and a second connection assembly, wherein the first connection assembly has a protrusion, and the second connection assembly has a groove configured to retain the protrusion of the first connection assembly, thus connecting the first connection assembly and the second connection assembly together. However, the first connection assembly and the second connection assembly cannot be reinforced securely.

The present invention has arisen to mitigate and/or obviate the afore-described disadvantages.

SUMMARY OF THE INVENTION

The primary objective of the present invention is to provide a detachable bed base in which the first connection assembly and the second connection assembly are supported and reinforced stably.

Another objective of the present invention is to provide a detachable bed base in which the multiple reinforcement posts are connected between the first connection assembly and the second connection assembly so as to reinforce the detachable bed base.

To obtain above-mentioned objects, a detachable bed base provided by the present invention contains: a first connection assembly, a second connection assembly, multiple support rods, two frames, and multiple screw elements.

The multiple support rods connect the first connection assembly and the second connection assembly together, the first connection assembly includes a plurality of first hollow tubes arranged on a bottom of the first connection assembly, and the second connection assembly includes a plurality of second hollow tubes arranged on a bottom of the second connection assembly and connecting with the plurality of first hollow tubes of the first connection assembly.

The multiple support rods insert into and extend out of the plurality of first hollow tubes of the first connection assembly so as to fit with the plurality of second hollow tubes of the second connection assembly, and the multiple screw elements lock the multiple support rods, the plurality of first hollow tubes, and the plurality of second hollow tubes together, hence the first connection assembly and the second connection assembly are connected together.

Multiple reinforcement posts are connected between the first connection assembly and the second connection assembly, wherein multiple first C-shaped slats connect the first connection assembly and some of the multiple reinforcement posts together, and multiple second C-shaped slats couple the second connection assembly and the others of the multiple reinforcement posts together.

Each of the multiple first C-shaped slats has a first accommodation recess defined between two peripheral sides of said each first C-shaped slat so as to accommodate a first end of each of the multiple reinforcement posts, and each of the multiple second C-shaped slats has a second accommodation recess defined between two peripheral sides of said each second C-shaped slat so as to accommodate a second end of said each reinforcement post.

Said each first C-shaped slat has two opposite first through holes formed on the two peripheral sides thereof so as to accommodate each of multiple fixing bolts, and a part of said each fixing bolt extends out of one of the two first through holes and has an aperture configured to house each of multiple pins, wherein said each second C-shaped slat has two opposite second through holes formed on the two peripheral sides thereof so as to accommodate said each fixing bolt, and the part of said each fixing bolt extends out of one of the two second through holes and has the aperture configured to insert said each pin, hence the multiple reinforcement posts support the detachable bed base.

Two frames hold the first connection assembly and the second connection assembly, respectively, and each of the two frames includes a first extension mounted on an outer end of the first connection assembly or the second connection assembly, said each frame also includes two second extensions coupling with two peripheral sides of the first connection assembly or the second connection assembly, wherein the first extension of said each frame has two hooks arranged on two edges thereof and locking with the two second extensions, respectively, wherein each of the two second extensions has a coupling holder corresponding to a first column of the first connection assembly or a second column of the second connection assembly, and said each second extension has a fitting trench and a positioning member which are connected with the first connection assembly or the second connection assembly.

A plurality of supporters lock the first column, the second column, and the coupling holder of said each second extension together, wherein each of the multiple supporters has a screwing peg extending outwardly from a bottom of said each supporter so as to screw with said each second extension, the first column of the first connection assembly, and the second column of the second connection assembly via the coupling holder of said each second extension.

DETAILED DESCRIPTION OF THE PREFERRED EMBODIMENTS

Figure 1:
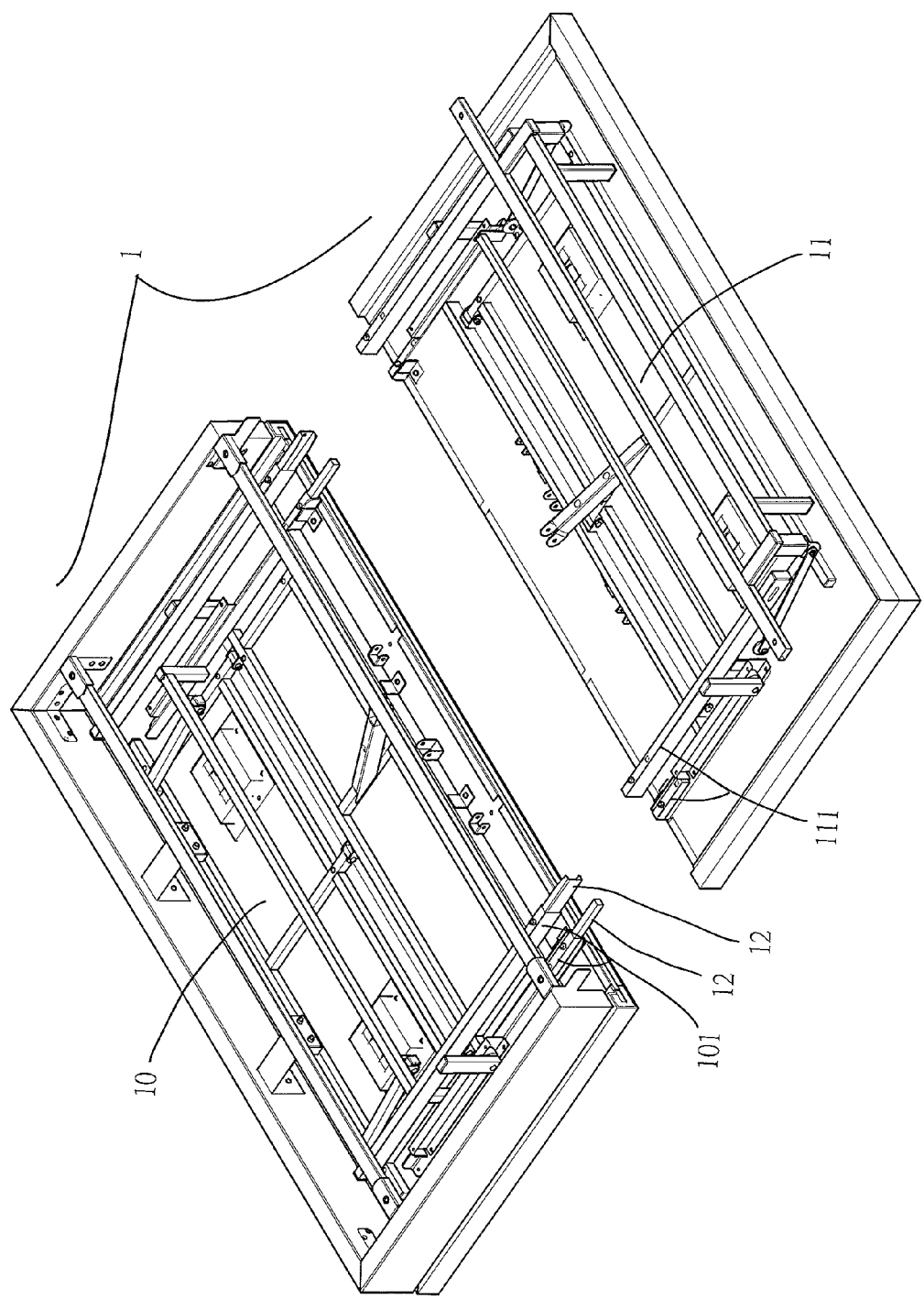
FIG. 1 is a perspective view showing the exploded components of a detachable bed base according to a preferred embodiment of the present invention.

With reference to FIG. 1, a detachable bed base 1 according to a preferred embodiment of the present invention comprises: a first connection assembly 10 and a second connection assembly 11 which mate with an electric cylinder (not shown).

Figure 2:
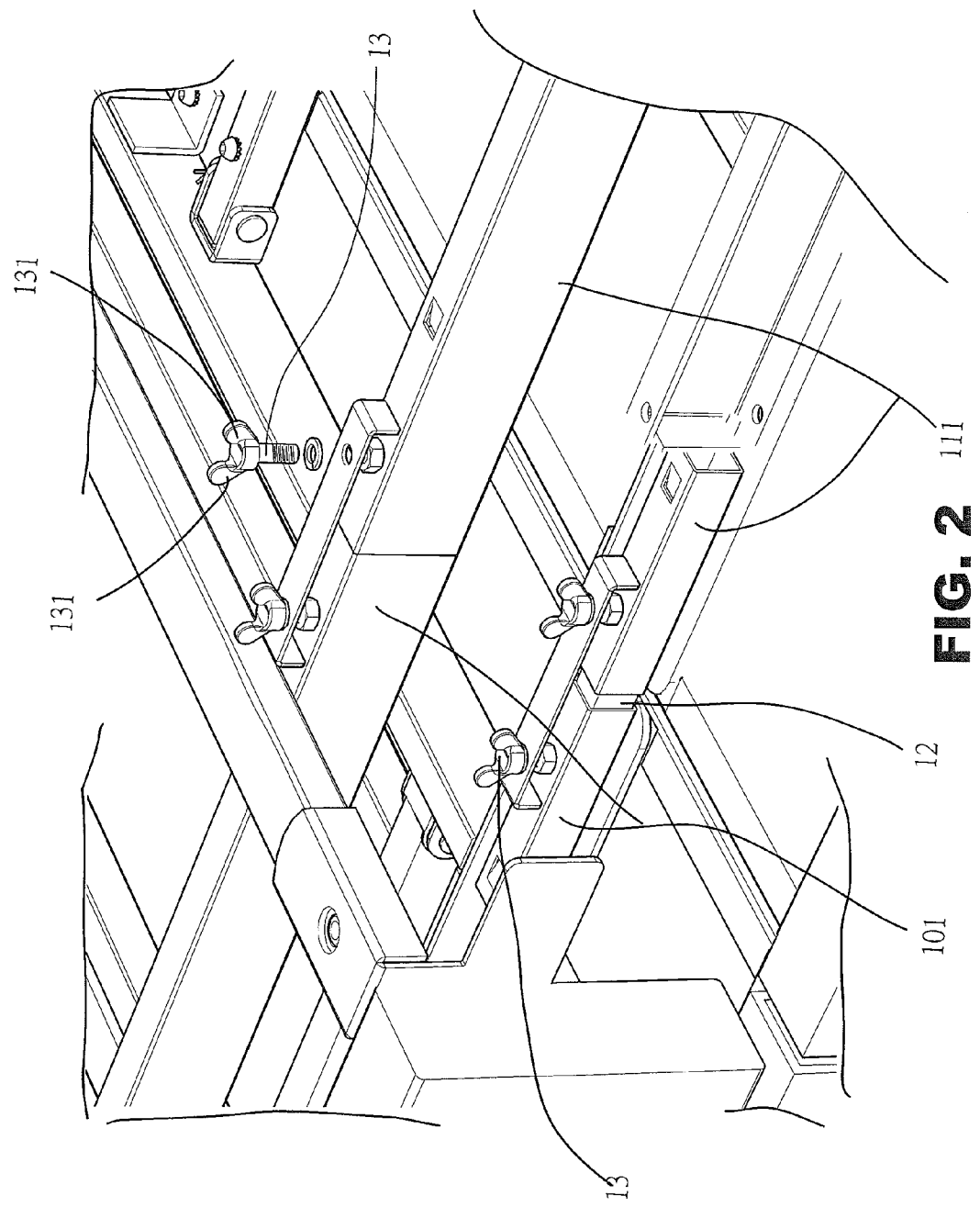
FIG. 2 is a perspective view showing the assembly of a part of the detachable bed base according to the preferred embodiment of the present invention.

Each of the first connection assembly 10 and the second connection assembly 11 includes multiple support rods 12, and a width of the detachable bed base 1 is within 180 cm to 190 cm, wherein the first connection assembly 10 includes a plurality of first hollow tubes 101 arranged on a bottom thereof, and the second connection assembly 11 includes a plurality of second hollow tubes 111 arranged on a bottom thereof and connecting with the plurality of first hollow tubes 101 of the first connection assembly 10. The multiple support rods 12 insert into and extend out of the plurality of first hollow tubes 101 of the first connection assembly 10 so as to fit with the plurality of second hollow tubes 111 of the second connection assembly 11, and multiple screw elements 13 lock the multiple support rods 12, the plurality of first hollow tubes 101, and the plurality of second hollow tubes 111 together (as shown in FIG. 2), hence the first connection assembly 10 and the second connection assembly 11 are connected together. Each of the multiple screw elements 13 is a butterfly screw and has two wings 13 extending outwardly from a top of said each screw element 13 so as to rotate said each screw element 13 tightly or loosely.

Figure 3:
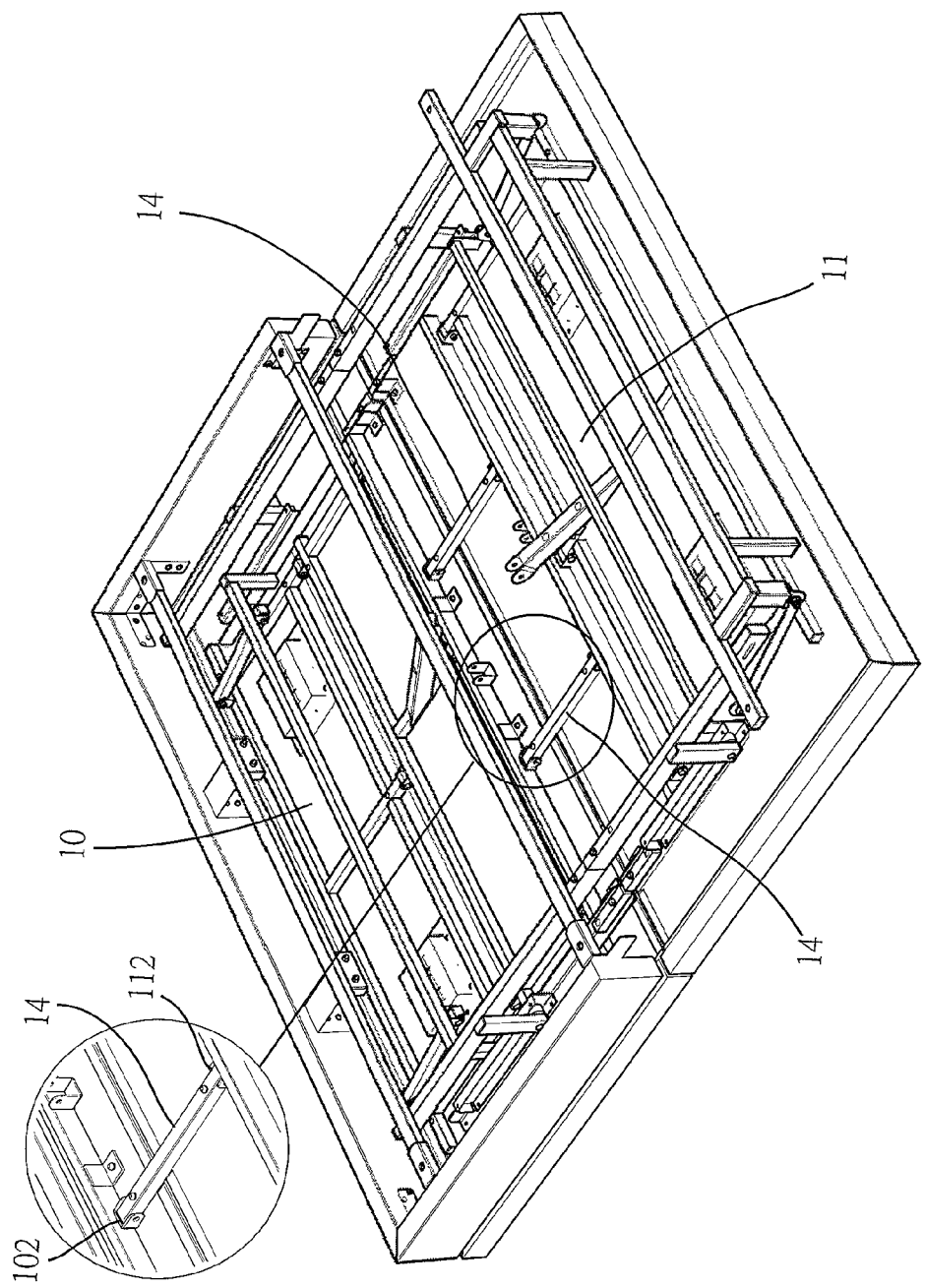
FIG. 3 is a perspective view showing the assembly of the detachable bed base according to the preferred embodiment of the present invention.
Figure 4:
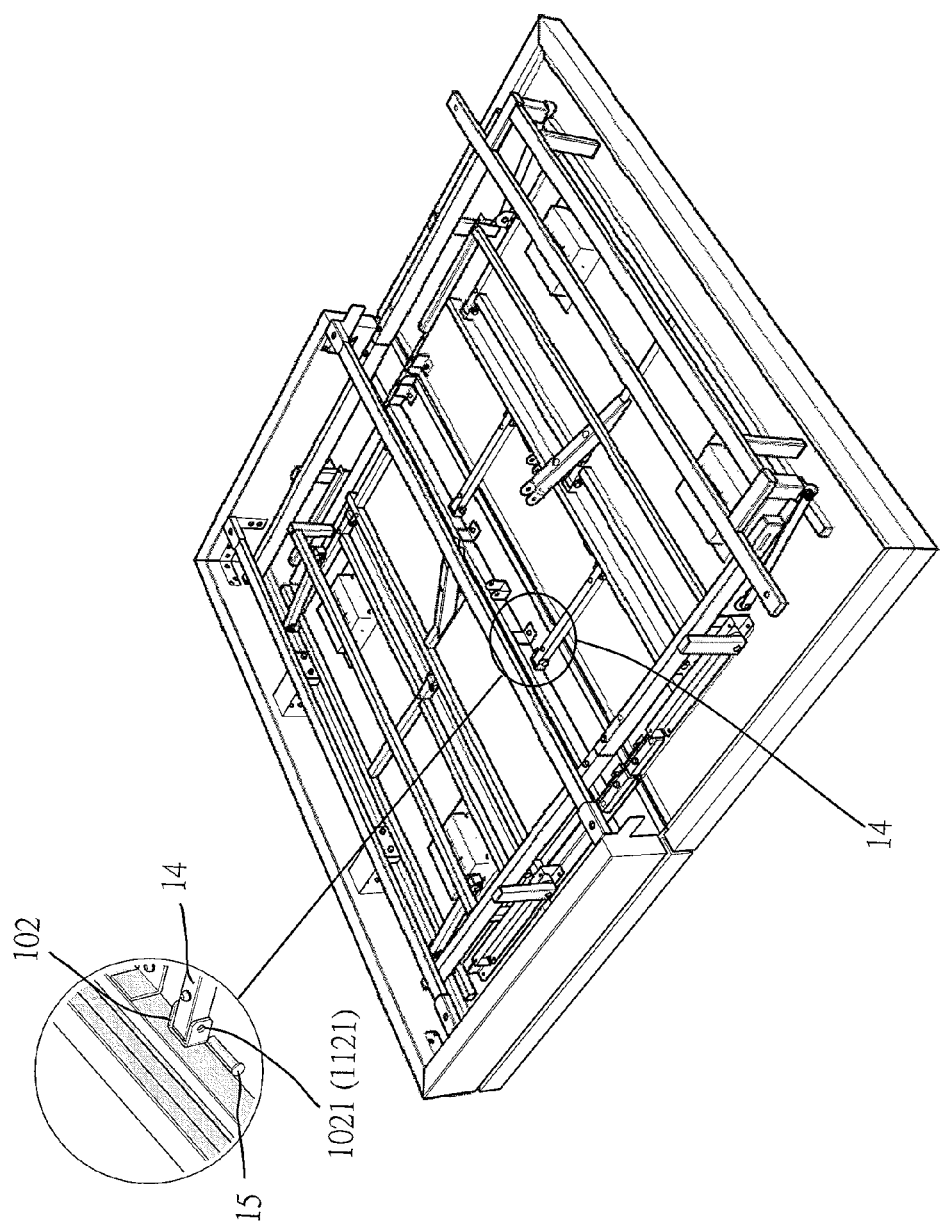
FIG. 4 is another perspective view showing the assembly of the detachable bed base according to the preferred embodiment of the present invention.
Figure 5:
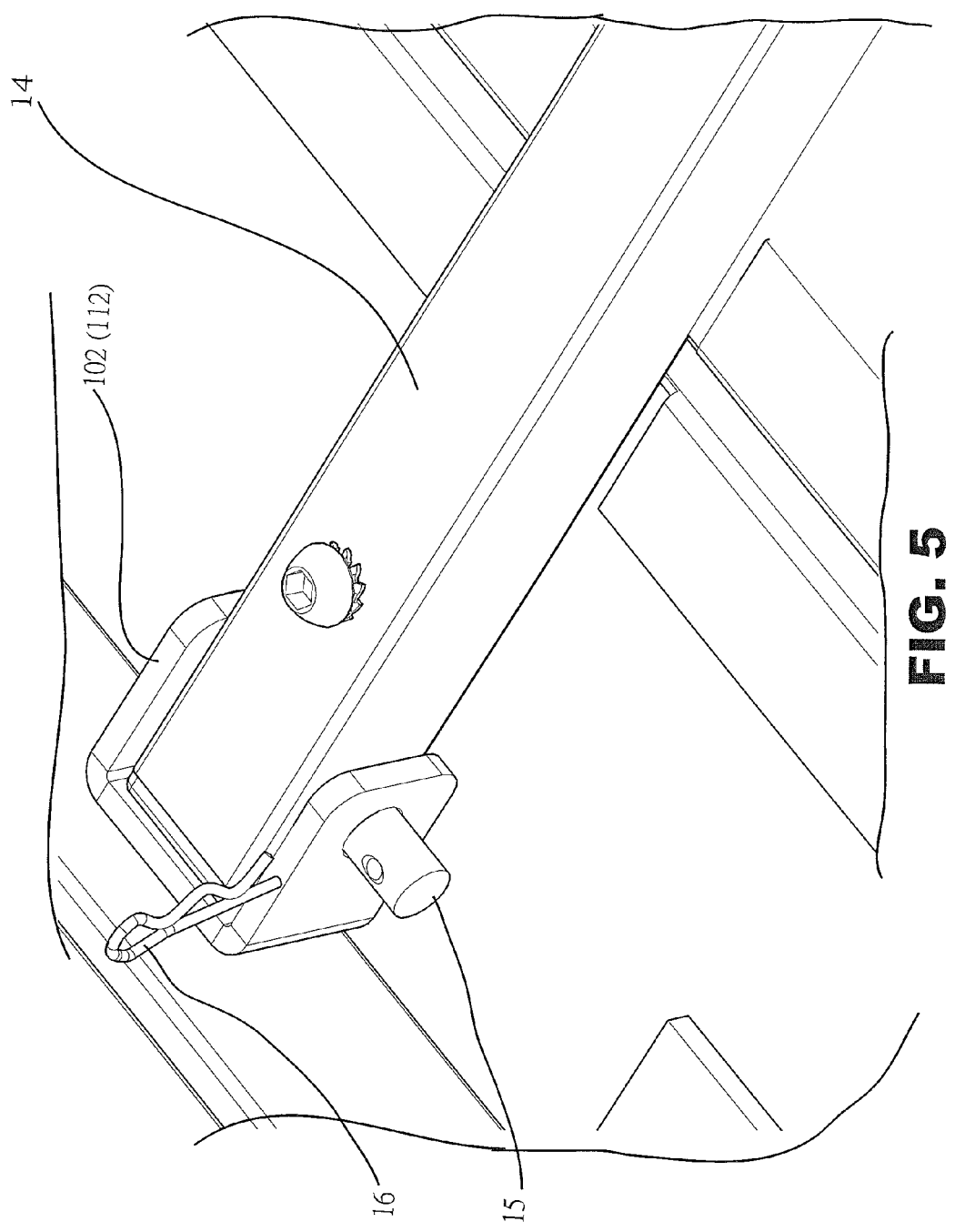
FIG. 5 is also a perspective view showing the assembly of another part of the detachable bed base according to the preferred embodiment of the present invention.
Figure 6:
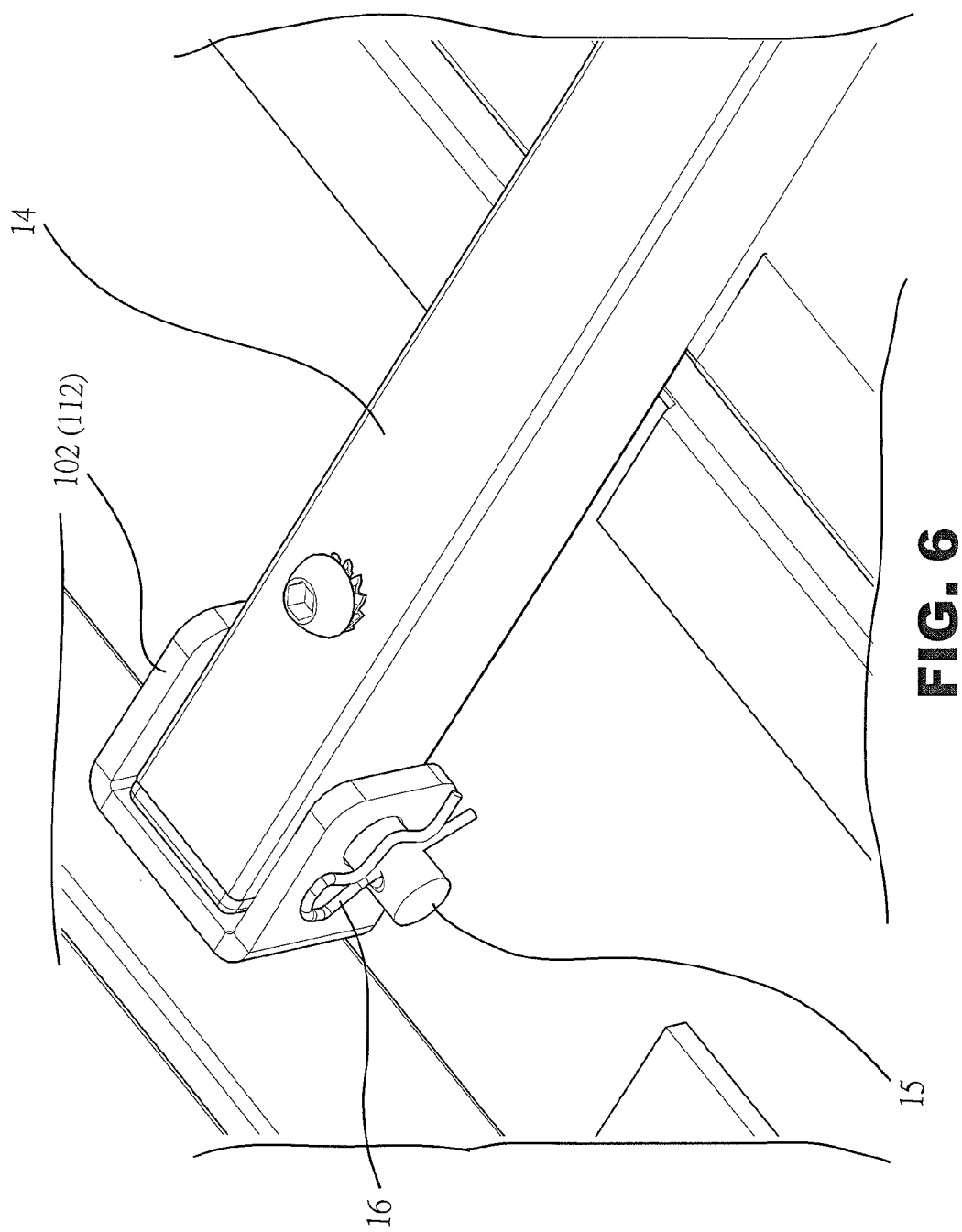
FIG. 6 is also another perspective view showing the assembly of another part of the detachable bed base according to the preferred embodiment of the present invention.

Referring to FIG. 3, multiple reinforcement posts 14 are connected between the first connection assembly 10 and the second connection assembly 11, wherein multiple first C-shaped slats 102 connect the first connection assembly 10 and some of the multiple reinforcement posts 14 together, and multiple second C-shaped slats 112 couple the second connection assembly 11 and the others of the multiple reinforcement posts 14 together (as shown in FIG. 4), wherein each of the multiple first C-shaped slats 102 has a first accommodation recess defined between two peripheral sides of said each first C-shaped slat 102 so as to accommodate a first end of each of the multiple reinforcement posts 14, and each of the multiple second C-shaped slats 112 has a second accommodation recess defined between two peripheral sides of said each second C-shaped slat 112 so as to accommodate a second end of said each reinforcement post 14. As illustrated in FIG. 5, said each first C-shaped slat 102 has two opposite first through holes 1021 formed on the two peripheral sides thereof so as to accommodate each of multiple fixing bolts 15, and a part of said each fixing bolt 15 extends out of one of the two first through holes 1021 and has an aperture configured to house each of multiple pins 15, and said each second C-shaped slat 112 has two opposite second through holes 1121 formed on the two peripheral sides thereof so as to accommodate said each fixing bolt 15, and the part of said each fixing bolt 15 extends out of one of the two second through holes 1121 and has the aperture configured to insert said each pin 15 (as shown in FIG. 6), hence the multiple reinforcement posts 14 support the detachable bed base 1 securely.

Figure 7:
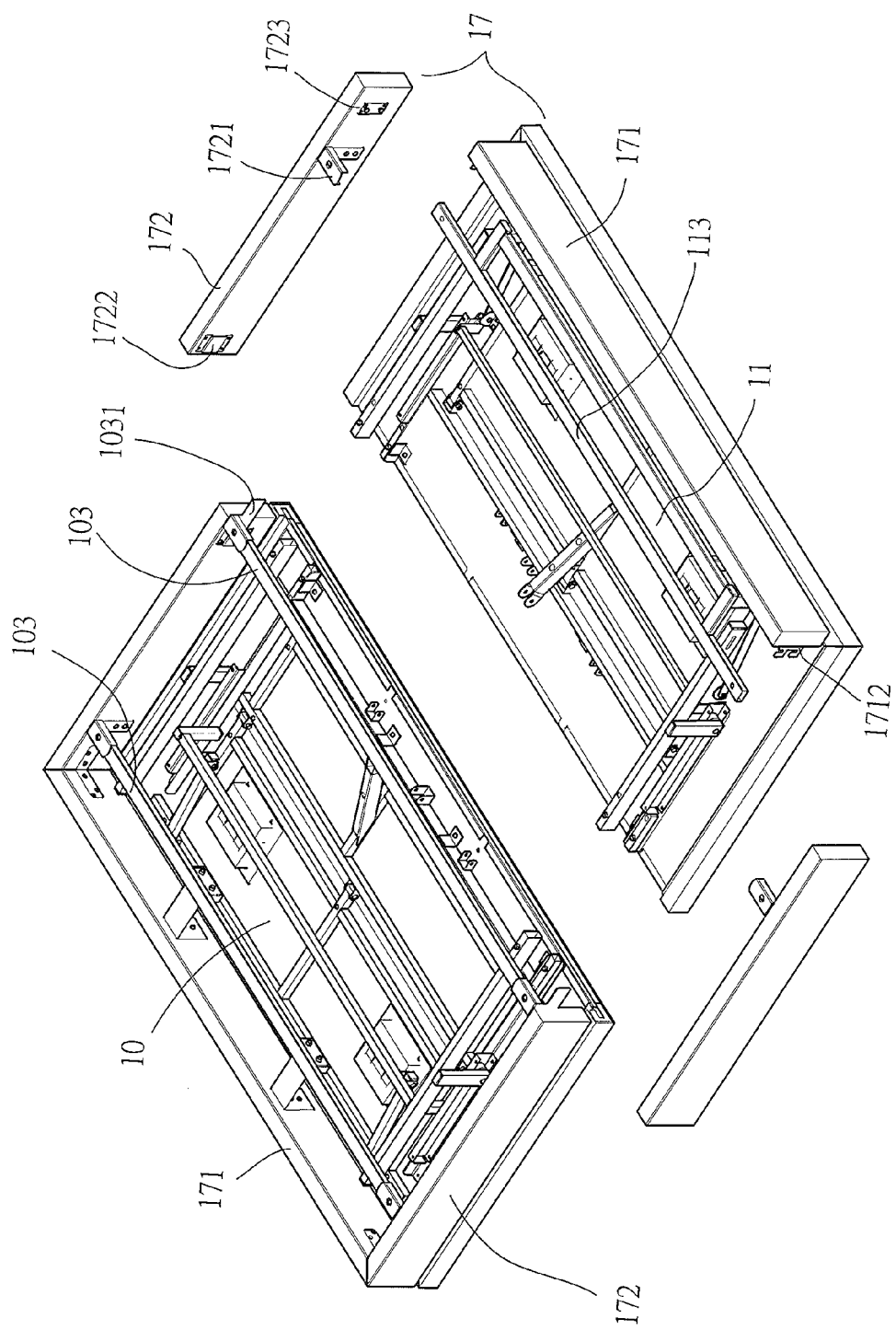
FIG. 7 is another perspective view showing the exploded components of the detachable bed base according to the preferred embodiment of the present invention.

With reference to FIG. 7, two frames 17 hold the first connection assembly 10 and the second connection assembly 11, respectively, and each of the two frames 17 includes a first extension 171 mounted on an outer end of the first connection assembly 10 or the second connection assembly 11, said each frame 17 also includes two second extensions 172 coupling with two peripheral sides of the first connection assembly 10 or the second connection assembly 11, wherein the first extension 171 of said each frame 17 has two hooks 1712 arranged on two edges thereof and locking with the two second extensions 172, respectively, wherein each of the two second extensions 172 has a coupling holder 1721 corresponding to a first column 103 of the first connection assembly 10 or a second column 113 of the second connection assembly 11, and said each second extension 172 has a fitting trench 1722 and a positioning member 1723 which are connected with the first connection assembly 10 or the second connection assembly 11.

Figure 8:
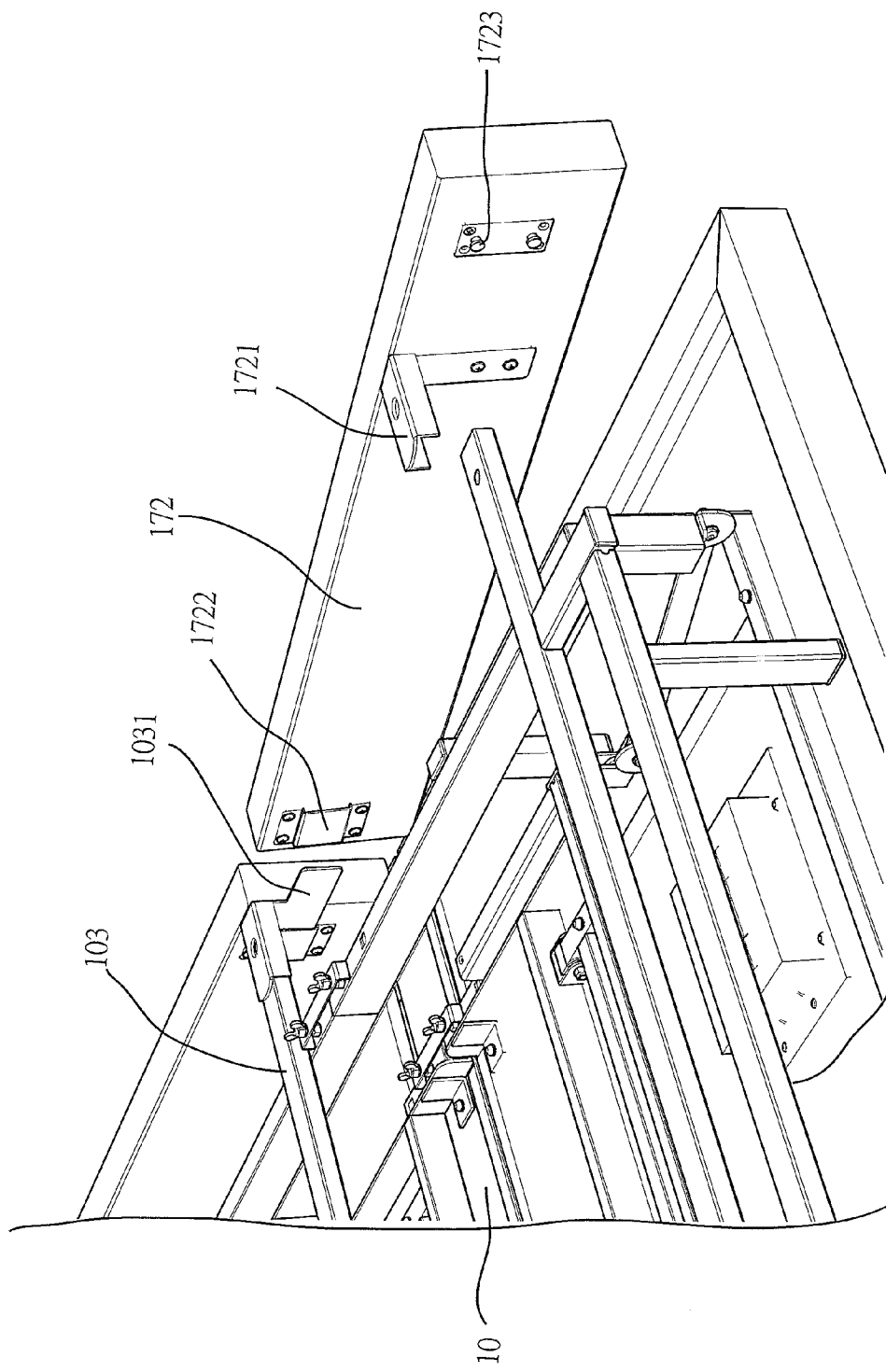
FIG. 8 is a perspective view showing the operation of a part of the detachable bed base according to the preferred embodiment of the present invention.
Figure 9:
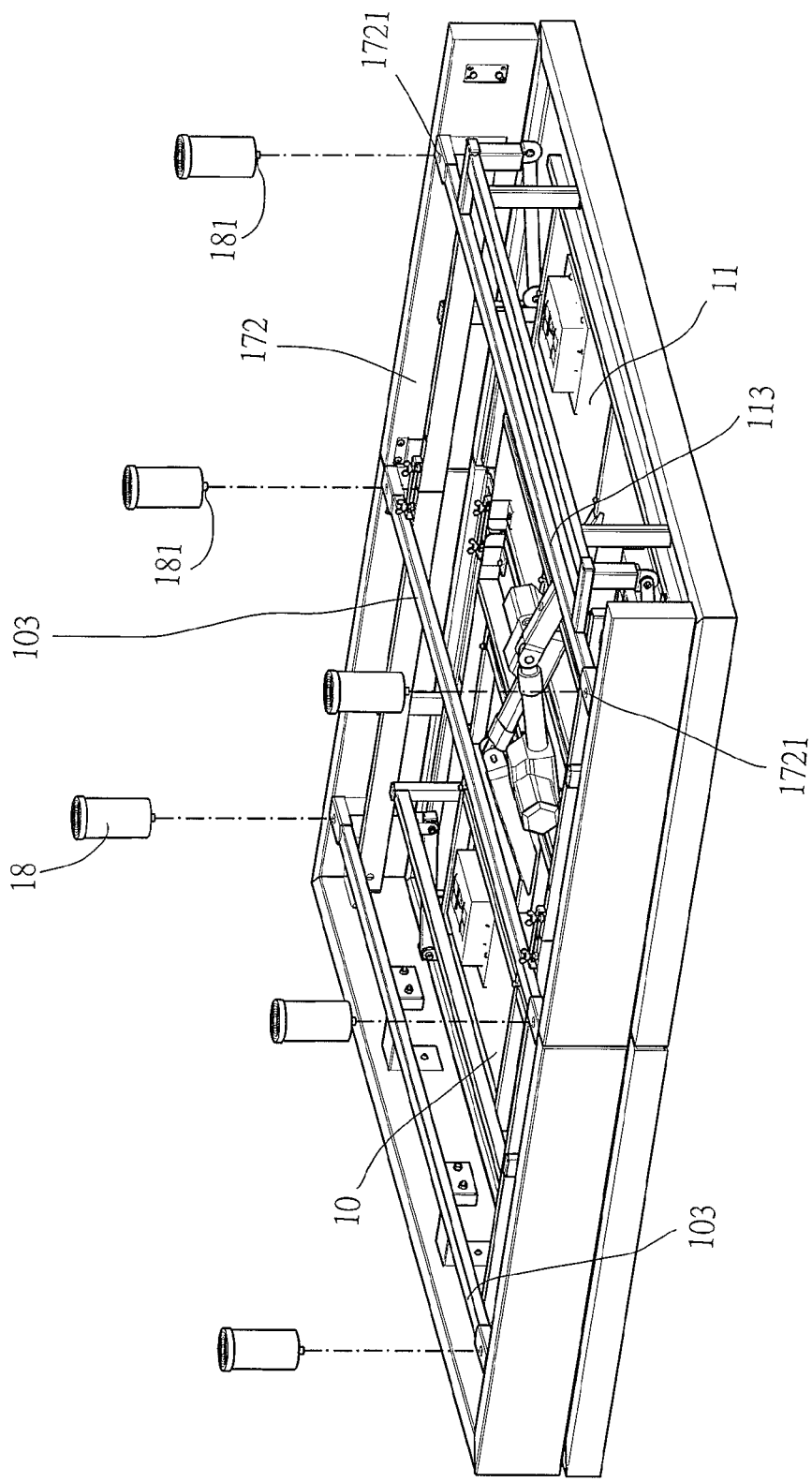
FIG. 9 is a perspective view showing the operation of the detachable bed base according to the preferred embodiment of the present invention.
Figure 10:
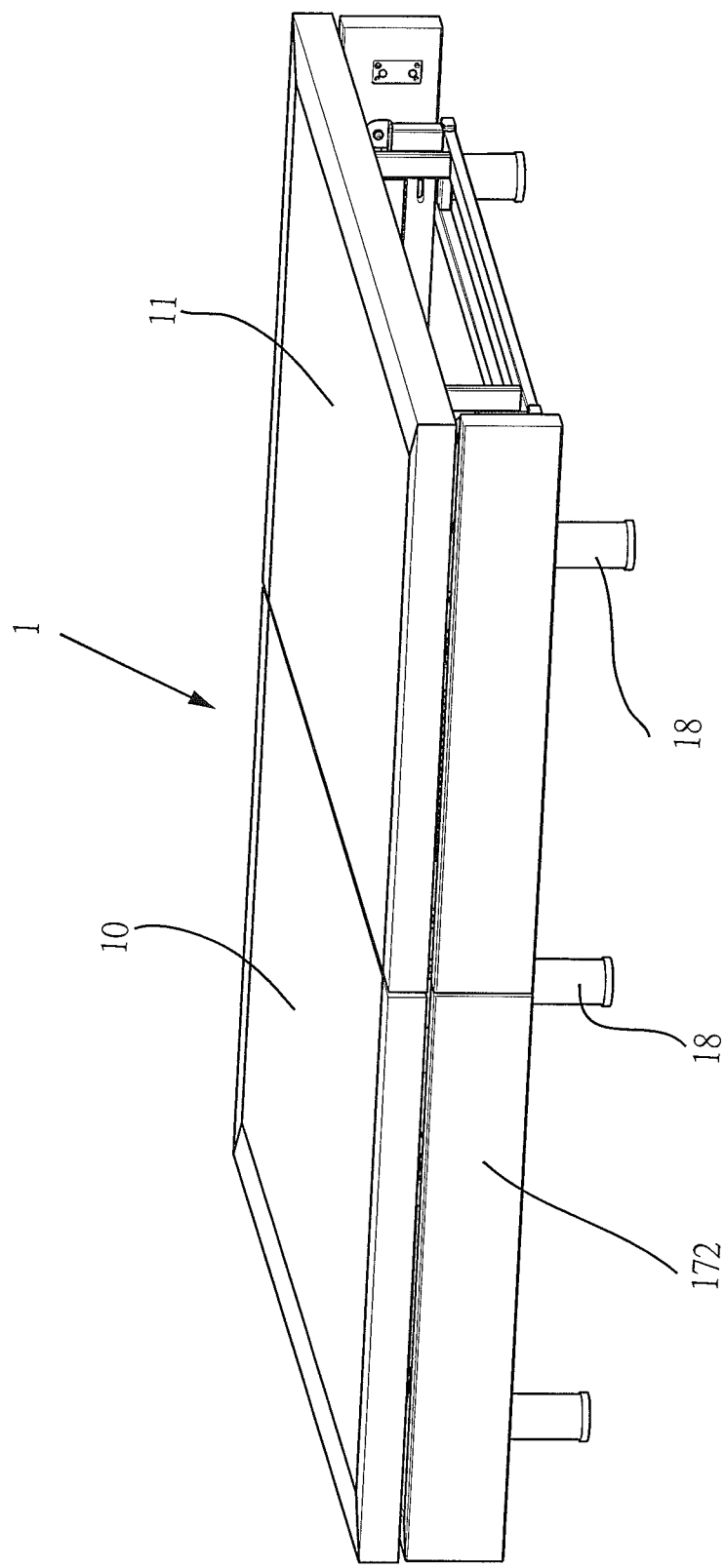
FIG. 10 is another perspective view showing the operation of the detachable bed base according to the preferred embodiment of the present invention.

In assembly, said first extension 171 is fixed on the outer end of the first connection assembly 10 or the second connection assembly 11, and the coupling holder 1721 of said each second extension 172 is aligned with the first column 103 of the first connection assembly 10 or the second column 113 of the second connection assembly 11, then the fitting trench 1722 is fitted with an inverted T-shaped sheet 1031 of the first column 103 of the first connection assembly 10 (as illustrated in FIG. 8), hence said each second extension 172 is fixed on each of the two peripheral sides of the first connection assembly 10 or the second connection assembly 11. Thereafter, each of the two hooks 1712 of the first extension 171 is fitted with the positioning member 1723 of said each second extension 172 so that the first extension 171 is coupled with said each second extension 172. Referring further to FIG. 9, a plurality of supporters 181 lock the first column 103, the second column 113, and the coupling holder 1721 of said each second extension 172 together, wherein each of the multiple supporters 18 has a screwing peg 181 extending outwardly from a bottom of said each supporter 18 so as to screw with said each second extension 172, the first column 103 of the first connection assembly 10, and the second column 113 of the second connection assembly 11 via the coupling holder 1721 of said each second extension 172, thus connecting the detachable bed base 1, as shown in FIG. 10.

Accordingly, the multiple supporters 18 support the first connection assembly 10 and the second connection assembly 11 stably, and the two frames 17 fix the detachable bed base 1 firmly.

Preferably, the multiple reinforcement posts 14 are connected between the first connection assembly 10 and the second connection assembly 11 so as to reinforce the detachable bed base 1. In addition, a driving motor set (not shown) is housed in the detachable bed base 1 so as to drive a movement of the detachable bed base 1 easily.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A detachable bed base comprising: a first connection assembly, a second connection assembly, multiple support rods, two frames, and multiple screw elements;

the multiple support rods connecting the first connection assembly and the second connection assembly together, the first connection assembly including a plurality of first hollow tubes arranged on a bottom of the first connection assembly, and the second connection assembly including a plurality of second hollow tubes arranged on a bottom of the second connection assembly and connecting with the plurality of first hollow tubes of the first connection assembly;

the multiple support rods inserting into and extending out of the plurality of first hollow tubes of the first connection assembly so as to fit with the plurality of second hollow tubes of the second connection assembly, and the multiple screw elements locking the multiple support rods, the plurality of first hollow tubes, and the plurality of second hollow tubes together, hence the first connection assembly and the second connection assembly are connected together;

wherein multiple reinforcement posts are connected between the first connection assembly and the second connection assembly, multiple first C-shaped slats connect the first connection assembly and some of the multiple reinforcement posts together, and multiple second C-shaped slats couple the second connection assembly and the others of the multiple reinforcement posts together;

wherein each of the multiple first C-shaped slats has a first accommodation recess defined between two peripheral sides of said each first C-shaped slat so as to accommodate a first end of each of the multiple reinforcement posts, and each of the multiple second C-shaped slats has a second accommodation recess defined between two peripheral sides of said each second C-shaped slat so as to accommodate a second end of said each reinforcement post;

wherein said each first C-shaped slat has two opposite first through holes formed on the two peripheral sides thereof so as to accommodate each of multiple fixing bolts, and a part of said each fixing bolt extends out of one of the two first through holes and has an aperture configured to house each of multiple pins, and said each second C-shaped slat has two opposite second through holes formed on the two peripheral sides thereof so as to accommodate said each fixing bolt, wherein the part of said each fixing bolt extends out of one of the two second through holes and has the aperture configured to insert said each pin, hence the multiple reinforcement posts support the detachable bed base;

wherein two frames hold the first connection assembly and the second connection assembly, respectively, and each of the two frames includes a first extension mounted on an outer end of the first connection assembly or the second connection assembly, said each frame also includes two second extensions coupling with two peripheral sides of the first connection assembly or the second connection assembly, wherein the first extension of said each frame has two hooks arranged on two edges thereof and locking with the two second extensions, respectively, wherein each of the two second extensions has a coupling holder corresponding to a first column of the first connection assembly or a second column of the second connection assembly, and said each second extension has a fitting trench and a positioning member which are connected with the first connection assembly or the second connection assembly; and wherein a plurality of supporters lock the first column, the second column, and the coupling holder of said each second extension together, wherein each of the multiple supporters has a screwing peg extending outwardly from a bottom of said each supporter so as to screw with said each second extension, the first column of the first connection assembly, and the second column of the second connection assembly via the coupling holder of said each second extension.

2. The detachable bed base as claimed in claim 1, wherein each of the multiple screw elements is a butterfly screw and has two wings extending outwardly from a top of said each screw element so as to rotate said each screw element tightly or loosely.

* * * * *